US012777308B2

(12) United States Patent
Mizuno et al.

(10) Patent No.: US 12,777,308 B2
(45) Date of Patent: Oct. 27, 2026

(54) INFORMATION PROCESSING METHOD, RECORDING MEDIUM, AND SOUND REPRODUCTION DEVICE

(71) Applicant: Panasonic Intellectual Property Corporation of America, Torrance, CA (US)

(72) Inventors: Ko Mizuno, Osaka (JP); Tomokazu Ishikawa, Osaka (JP); Seigo Enomoto, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 346 days.

(21) Appl. No.: 18/108,910

(22) Filed: Feb. 13, 2023

(65) Prior Publication Data

US 2023/0199428 A1 Jun. 22, 2023

Related U.S. Application Data

(63) Continuation of application No. PCT/JP2021/026589, filed on Jul. 15, 2021.

(Continued)

(30) Foreign Application Priority Data

May 31, 2021 (JP) ................................. 2021-090992

(51) Int. Cl.

*H04S 7/00* (2006.01)
*H04R 1/32* (2006.01)

(52) U.S. Cl.

CPC ................. *H04S 7/40* (2013.01); *H04R 1/32* (2013.01); *H04S 7/306* (2013.01); *H04S 2400/13* (2013.01); *H04S 2400/15* (2013.01)

(58) Field of Classification Search

CPC .............. H04S 7/40; H04S 7/306; H04R 1/32
See application file for complete search history.

(56) References Cited

U.S. PATENT DOCUMENTS

2013/0272527 A1* 10/2013 Oomen .................... H04R 5/04 381/17
2014/0072142 A1* 3/2014 Nakadai ................ G01S 3/8083 381/92

(Continued)

FOREIGN PATENT DOCUMENTS

EP 3 588 926 1/2020
JP 2015-198297 A 11/2015

(Continued)

OTHER PUBLICATIONS

Extended European Search Report issued Jan. 4, 2024 in corresponding European Patent Application No. 21858080.1.

(Continued)

*Primary Examiner* — Carolyn R Edwards
*Assistant Examiner* — Dylan Maguire Neece
(74) *Attorney, Agent, or Firm* — Wenderoth, Lind & Ponack, L.L.P.

(57) ABSTRACT

An information processing method includes: (i) determining whether a type of a predetermined sound and a type of an external sound match; (ii) determining whether the incoming direction of the predetermined sound and the incoming direction of the external sound overlap by comparing the incoming direction of the predetermined sound with the incoming direction of the external sound analyzed; and performing at least one of the following based on a result of (i) and a result of (ii): (a) adjusting at least one of a sound pressure of the predetermined sound or a sound pressure of the external sound; or (b) adjusting the incoming direction of the predetermined sound.

12 Claims, 5 Drawing Sheets

Related U.S. Application Data

(60) Provisional application No. 63/068,103, filed on Aug. 20, 2020.

(56) References Cited

U.S. PATENT DOCUMENTS

| | | | | |
|---|---|---|---|---|
| 2015/0281867 | A1 | 10/2015 | Enamito et al. | |
| 2018/0302738 | A1* | 10/2018 | Di Censo | G06F 3/011 |
| 2019/0139530 | A1* | 5/2019 | Jarvinen | G10K 11/17837 |

FOREIGN PATENT DOCUMENTS

| | | |
|---|---|---|
| JP | 2020-18620 | 2/2020 |
| WO | 2020/159557 | 8/2020 |

OTHER PUBLICATIONS

International Search Report (ISR) issued on Oct. 12, 2021 in International (PCT) Application No. PCT/JP2021/026589.

* cited by examiner

INFORMATION PROCESSING METHOD, RECORDING MEDIUM, AND SOUND REPRODUCTION DEVICE

CROSS REFERENCE TO RELATED APPLICATIONS

This is a continuation application of PCT International Application No. PCT/JP2021/026589 filed on Jul. 15, 2021, designating the United States of America, which is based on and claims priority of Japanese Patent Application No. 2021-090992 filed on May 31, 2021 and U.S. Provisional Patent Application No. 63/068,103 filed on Aug. 20, 2020. The entire disclosures of the above-identified applications, including the specifications, drawings and claims are incorporated herein by reference in their entirety.

FIELD

The present disclosure relates to a sound reproduction device, and an information processing method and a recording medium related to the sound reproduction device.

BACKGROUND

Techniques relating to sound reproduction for causing a user to perceive 3D sounds by controlling the positions of sound images which are sensory sound-source objects in a virtual three-dimensional space have been conventionally known (for example, see Patent Literature (PTL) 1).

CITATION LIST

Patent Literature

PTL 1: Japanese Unexamined Patent Application Publication No. 2020-18620

SUMMARY

Technical Problem

Meanwhile, in causing a user to perceive sounds as 3D sounds in a three-dimensional sound field, a sound difficult to be perceived by the user may be produced. In information processing methods of the conventional sound reproduction devices or the like, an appropriate process may not be performed on such a sound difficult to be perceived.

In view of the above, the object of the present disclosure is to provide an information processing method or the like that allows a user to perceive 3D sounds more appropriately.

Solution to Problem

An information processing method according to one aspect of the present disclosure is an information processing method of generating an output sound signal from sound information including information regarding a predetermined sound and information regarding a predetermined direction. The output sound signal is a signal for causing a user to perceive the predetermined sound as a sound coming from an incoming direction in a three-dimensional sound field corresponding to the predetermined direction. The information processing method includes: (i) analyzing a type of the predetermined sound; (ii) analyzing a type of an external sound audible to the user as a sound coming from an external environment; (iii) analyzing an incoming direction of the external sound; (iv) determining whether the type of the predetermined sound and the type of the external sound match by comparing the type of the predetermined sound analyzed with the type of the external sound analyzed; (v) determining whether the incoming direction of the predetermined sound and the incoming direction of the external sound overlap by comparing the incoming direction of the predetermined sound with the incoming direction of the external sound analyzed; and (vi) performing at least one of the following based on a result of (iv) and a result of (v): (a) adjusting at least one of a sound pressure of the predetermined sound or a sound pressure of the external sound; or (b) adjusting the incoming direction of the predetermined sound.

Moreover, a sound reproduction device according to one aspect of the present disclosure is a sound reproduction device that generates and reproduces an output sound signal from sound information including information regarding a predetermined sound and information regarding a predetermined direction. The output sound signal is a signal for causing a user to perceive the predetermined sound as a sound coming from an incoming direction in a three-dimensional sound field corresponding to the predetermined direction. The sound reproduction device includes: an obtainer that obtains the sound information; a first analyzer that analyzes a type of the predetermined sound; a second analyzer that analyzes a type of an external sound audible to the user as a sound coming from an external environment; a third analyzer that analyzes an incoming direction of the external sound; a first determiner that determines whether the type of the predetermined sound and the type of the external sound match by comparing the type of the predetermined sound analyzed with the type of the external sound analyzed; a second determiner that determines whether the incoming direction of the predetermined sound and the incoming direction of the external sound overlap by comparing the incoming direction of the predetermined sound with the incoming direction of the external sound analyzed; an adjuster that performs at least one of the following: (a) adjusting at least one of a sound pressure of the predetermined sound or a sound pressure of the external sound; or (b) adjusting the incoming direction of the predetermined sound, based on a result of the determination by the first determiner and a result of the determination by the second determiner; and an outputter that outputs a sound according to the output sound signal generated by the adjustment.

Moreover, one aspect of the present disclosure can be implemented as a program for causing a computer to execute the sound reproduction method described above.

Note that these general or specific aspects may be implemented using a system, a device, a method, an integrated circuit, a computer program, or a non-transitory computer-readable recording medium such as a compact disc read only memory (CD-ROM), or using any combination of systems, devices, methods, integrated circuits, computer programs, and recording media.

Advantageous Effects

The present disclosure allows a user to perceive 3D sounds more appropriately.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Figure 1:
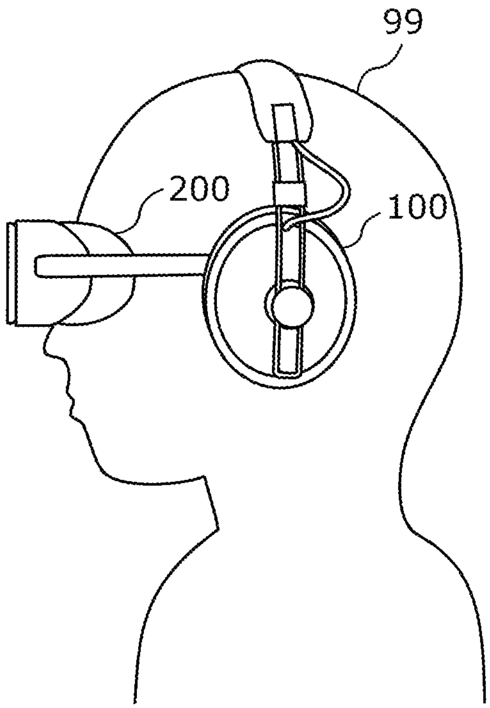
FIG. 1 is a schematic view illustrating an example of use of a sound reproduction device according to an embodiment.

Underlying Knowledge Forming Basis of the Present Disclosure

Techniques relating to sound reproduction for causing a user to perceive 3D sounds by controlling the positions of sound images which are user's sensory sound-source objects in a virtual three-dimensional space (hereinafter, also referred to as a three-dimensional sound field) have been conventionally known (for example, see PTL 1). A sound image is localized at a predetermined position in the virtual three-dimensional space. In this manner, a user can perceive a sound as if the sound comes from the direction parallel to a line connecting the predetermined position and the user (i.e., a predetermined direction). In order to localize a sound image at a predetermined position in the virtual three-dimensional space as described above, for example, a calculation process that processes a picked-up sound to produce a difference in sound level (or a difference in sound pressure) between ears, a difference in sound arrival time between ears, and the like, which cause a user to perceive a 3D sound, is needed.

As one example of such a calculation process, it is known that the signal of a target sound is convolved with a head-related transfer function to cause a user to perceive the sound as a sound coming from a predetermined direction. The presence felt by the user is enhanced by more finely performing the convolution process of the head-related transfer function. Meanwhile, in such a sound listening environment, it is known that the target sound is difficult to be distinguished due to overlap with an external sound coming from the external environment and audible to user 99. In particular, under the condition that there are a predetermined sound reproduced and an external sound that is of the same type and comes from the same direction as the predetermined sound, it may be difficult to distinguish between the predetermined sound and the external sound.

Moreover, in recent years, the development of techniques relating to virtual reality (VR) has been going on vigorously. In the virtual reality, a virtual three-dimensional space is independent from the motion of a user, and the focus of the virtual reality is that the user feels as if he/she were moving in the virtual space. In particular, in the virtual reality technique, the attempt to more enhance the presence by incorporating auditory elements into visual elements has been going on. For example, in the case where a sound image is localized in front of a user, the sound image moves to the left of the user when the user turns his/her head to the right, and the sound image moves to the right of the user when the user turns his/her head to the left. As seen from the above, in response to the motion of the user, the localized position of the sound image in the virtual space is needed to move in the direction opposite to the motion of the user. Such a process is performed by applying a 3D sound filter to the original sound information.

In view of the above, the present disclosure employs a 3D sound filter for causing a user to perceive a sound as a sound coming from a predetermined direction in a three-dimensional sound field, and performs a more appropriate calculation process that improves the distinguishability when a predetermined sound reproduced and an external sound coming from the external environment overlap. The object of the present disclosure is to provide an information processing method or the like that uses the appropriate calculation process to cause a user to perceive 3D sounds.

More specifically, an information processing method according to one aspect of the present disclosure is an information processing method of generating an output sound signal from sound information including information regarding a predetermined sound and information regarding a predetermined direction. The output sound signal is a signal for causing a user to perceive the predetermined sound as a sound coming from an incoming direction in a three-dimensional sound field corresponding to the predetermined direction. The information processing method includes: (i) analyzing a type of the predetermined sound; (ii) analyzing a type of an external sound audible to the user as a sound coming from an external environment; (iii) analyzing an incoming direction of the external sound; (iv) determining whether the type of the predetermined sound and the type of the external sound match by comparing the type of the predetermined sound analyzed with the type of the external sound analyzed; (v) determining whether the incoming direction of the predetermined sound and the incoming direction of the external sound overlap by comparing the incoming direction of the predetermined sound with the incoming direction of the external sound analyzed; and (vi) performing at least one of the following based on a result of (iv) and a result of (v): (a) adjusting at least one of a sound pressure of the predetermined sound or a sound pressure of the external sound; or (b) adjusting the incoming direction of the predetermined sound.

According to such an information processing method, when the external sound and the predetermined sound have influence on each other due to at least one of the overlap of the incoming direction of the external sound and the incoming direction of the predetermined sound or the sameness of the type of the external sound and the type of the predetermined sound and the user has difficulty listening to both the sounds, at least one of the adjustments (a) and (b) is performed. Accordingly, the audibility of at least one of the external sound or the predetermined sound is increased, and thus it is possible to cause the user to perceive the 3D sounds more appropriately.

Moreover, for example, in (vi), at least one of (a) or (b) may be performed when it is determined in (iv) that the type of the predetermined sound and the type of the external sound match and it is determined in (v) that the incoming direction of the predetermined sound and the incoming direction of the external sound overlap.

In this manner, when the external sound and the predetermined sound have influence on each other due to the overlap of the incoming direction of the external sound and the incoming direction of the predetermined sound and the sameness of the type of the external sound and the type of the predetermined sound and the user has difficulty listening to both the sounds, at least one of the adjustments (a) and (b) is performed. Accordingly, the audibility of at least one of the external sound or the predetermined sound is increased, and thus it is possible to cause the user to perceive the 3D sounds more appropriately.

Moreover, for example, in (vi), (a) may include generating a superposition sound having a phase opposite to a phase of the external sound and superposing the superposition sound on the external sound to reduce a sound pressure of the external sound.

In this manner, the superposition sound is superposed on the external sound and the user listens to the superposed sound. Accordingly, the sound pressure of the external sound is reduced, and thus it is possible to cause the user to perceive the 3D sounds more appropriately.

Moreover, for example, in (vi), (b) may include turning the incoming direction of the predetermined sound in a direction away from the incoming direction of the external sound by an angle set in advance.

In this manner, the incoming direction of the predetermined sound and the incoming direction of the external sound are prevented from overlapping. Accordingly, the audibility of at least one of the external sound or the predetermined sound is increased, and thus it is possible to cause the user to perceive the 3D sounds more appropriately.

Moreover, for example, in (vi), (b) may include correcting the information regarding the predetermined direction to turn the incoming direction of the predetermined sound in a direction away from the incoming direction of the external sound by an angle set in advance.

In this manner, the incoming direction of the predetermined sound and the incoming direction of the external sound are prevented from overlapping. Accordingly, the audibility of at least one of the external sound or the predetermined sound is increased, and thus it is possible to cause the user to perceive the 3D sounds more appropriately. For this purpose, the information regarding the predetermined direction included in the sound information is corrected, and thus the 3D sound filter to be selected can be changed to the 3D sound filter for preventing the incoming direction of the predetermined sound and the incoming direction of the external sound from overlapping. As the result, the audibility of at least one of the external sound or the predetermined sound is increased, and thus it is possible to cause the user to perceive the 3D sounds more appropriately.

Moreover, for example, the analyzing the type of the predetermined sound and the analyzing the type of the external sound each may include: dividing a sound to be analyzed on a unit time basis in a time domain; inputting the sound divided to a machine learning model to calculate a likelihood for each of types set in advance; and outputting a result of the analysis indicating that a type of the sound inputted corresponds to a type having a highest likelihood calculated.

In this manner, using the machine learning model, it is possible to output the result of the analysis indicating that the analyzed sound corresponds to the type having the highest likelihood among the types set in advance.

Moreover, for example, the predetermined sound may be of two types: a voice; and a non-voice, and the external sound may be also of two types: a voice; and a non-voice.

In this manner, based on whether each of the type of the external sound and the type of the predetermined sound is a voice or a non-voice, it can be determined whether the type of the external sound and the type of the predetermined sound match.

Moreover, for example, whether the incoming direction of the predetermined sound and the incoming direction of the external sound overlap is determined based on whether a difference in angle between the incoming direction of the predetermined sound and the incoming direction of the external sound is less than a threshold, and a first threshold may be greater than a second threshold. The first threshold is the threshold when the incoming direction of the predetermined sound and the incoming direction of the external sound are behind a virtual boundary surface separating a head of the user into a front portion and a rear portion. The second threshold is the threshold when the incoming direction of the predetermined sound and the incoming direction of the external sound are in front of the virtual boundary surface.

In this manner, in the rear side in which the incoming direction of the external sound and the incoming direction of the predetermined sound are easily regarded as overlapping since the minimum distinguishable angle for the incoming direction is larger than that of the front side, it is possible to determine whether the incoming direction of the external sound and the incoming direction of the predetermined sound overlap based on a criteria wider than that of the front side.

Moreover, a recording medium according to one aspect of the present disclosure is a non-transitory computer-readable recording medium having a program recorded thereon for causing a computer to execute the above-mentioned information processing method.

With this, using a computer, it is possible to produce the same effects as the above-mentioned information processing method.

Moreover, a sound reproduction device according to one aspect of the present disclosure is a sound reproduction device that generates and reproduces an output sound signal from sound information including information regarding a predetermined sound and information regarding a predetermined direction. The output sound signal is a signal for causing a user to perceive the predetermined sound as a sound coming from an incoming direction in a three-dimensional sound field corresponding to the predetermined direction. The sound reproduction device includes: an obtainer that obtains the sound information; a first analyzer that analyzes a type of the predetermined sound; a second analyzer that analyzes a type of an external sound audible to the user as a sound coming from an external environment; a third analyzer that analyzes an incoming direction of the external sound; a first determiner that determines whether the type of the predetermined sound and the type of the external sound match by comparing the type of the predetermined sound analyzed with the type of the external sound analyzed; a second determiner that determines whether the incoming direction of the predetermined sound and the incoming direction of the external sound overlap by comparing the incoming direction of the predetermined sound with the incoming direction of the external sound analyzed; an adjuster that performs at least one of the following: (a) adjusting at least one of a sound pressure of the predetermined sound or a sound pressure of the external sound; or (b) adjusting the incoming direction of the predetermined sound, based on a result of the determination by the first determiner and a result of the determination by the second determiner; and an outputter that outputs a sound according to the output sound signal generated by the adjustment.

With this, it is possible to produce the same effects as the above-mentioned information processing method.

Furthermore, these general and specific aspects may be implemented using a system, a device, a method, an integrated circuit, a computer program, or a non-transitory computer-readable medium such as a CD-ROM, or any combination of systems, devices, methods, integrated circuits, computer programs, or computer-readable media.

Hereinafter, an embodiment is specifically described with reference to the drawings. Note that the embodiment described here indicates one general or specific example of the present disclosure. The numerical values, shapes, materials, constituent elements, the arrangement and connection of the constituent elements, steps, the order of the steps, etc., indicated in the following embodiments are mere examples, and therefore do not limit the scope of the claims. In addition, among the structural components in the embodiment, components not recited in the independent claim are described as arbitrary structural components. Note that each of the drawings is a schematic diagram, and thus is not always illustrated precisely. Throughout the drawings, substantially the same elements are assigned with the same numerical references, and overlapping descriptions are omitted or simplified.

In addition, in the descriptions below, ordinal numbers such as first, second, and third may be assigned to elements. These ordinal numbers are assigned to the elements for the purpose of identifying the elements, and do not necessarily correspond to meaningful orders. These ordinal numbers may be switched as necessary, one or more ordinal numbers may be newly assigned, or some of the ordinal numbers may be removed.

Embodiment (Outline)

First, the outline of a sound reproduction device according to an embodiment is described. FIG. 1 is a schematic view illustrating an example of use of the sound reproduction device according to the embodiment. FIG. 1 shows user 99 who is using sound reproduction device 100.

Sound reproduction device 100 shown in FIG. 1 is used simultaneously with 3D image reproduction device 200. Viewing a 3D image and listening to a 3D sound are performed simultaneously, and thus the image and the sound mutually enhance the auditory presence and the visual presence, respectively. Accordingly, a user can feel as if he/she were in a location where the image and the sound have been recorded. For example, it is known that, in the case where an image (a video) of a person who is speaking is displayed, even when the localization of the sound image of the speech sound does not match with the mouth of the person, user 99 perceives a sound as the speech sound emitted from the mouth of the person. As seen from the above, the presence may be enhanced by combining the image and the sound, e.g., correcting the position of the sound image using the visual information.

3D image reproduction device 200 is an image display device worn on the head of user 99. Accordingly, 3D image reproduction device 200 moves integrally with the head of user 99. For example, as shown in FIG. 1, 3D image reproduction device 200 is a glasses-shaped device supported by the ears and nose of user 99.

3D image reproduction device 200 changes the displayed image according to the motion of the head of user 99, thereby allowing user 99 to feel as if user 99 turns his/her head in the three-dimensional image space. In other words, in the case where an object in the three-dimensional image space is located in front of user 99, the object moves to the left of user 99 when user 99 turns his/her head to the right, and the object moves to the right of user 99 when user 99 turns his/her head to the left. As described above, in response to the motion of user 99, 3D image reproduction device 200 moves the three-dimensional image space in the direction opposite to the motion of user 99.

3D image reproduction device 200 provides two images with a disparity respectively to the right and left eyes of user 99. User 99 can perceive the three-dimensional position of an object on the image based on the disparity between the provided images. Note that, when sound reproduction device 100 is used to reproduce a healing sound for inducing sleep, user 99 uses sound reproduction device 100 with his/her eyes closed, or the like, 3D image reproduction device 200 need not be used simultaneously. In other words, 3D image reproduction device 200 is not an essential component of the present disclosure.

Sound reproduction device 100 is a sound presentation device worn on the head of user 99. Accordingly, sound reproduction device 100 moves integrally with the head of user 99. For example, sound reproduction device 100 according to the present embodiment is a so-called over-ear headphone-shaped device. Note that the shape of sound reproduction device 100 is not limited to this. For example, a pair of two earplug-shaped devices independently worn on the right and left ears of user 99 is possible. The two devices communicate with each other, thereby presenting synchronized sounds of a sound for the right ear and a sound for the left ear.

Sound reproduction device 100 changes reproduction sound according to the motion of the head of user 99, thereby allowing user 99 to feel as if user 99 turns his/her head in the three-dimensional sound field. Accordingly, as described above, in response to the motion of user 99, sound reproduction device 100 moves the three-dimensional sound field in the direction opposite to the motion of the user.

Here, it is known that, when the sound image presented to the user and an external sound coming from the external environment and audible to the user overlap, user 99 has difficulty distinguishing the sounds. Sound reproduction device 100 according to the present embodiment corrects the reproduction sound by processing the sound information to avoid such a phenomenon, thereby allowing user 99 to perceive at least one of the sound image or the external sound. In other words, sound reproduction device 100 operates to detect whether the sound image and the external sound overlap and eliminate the overlap, thereby allowing user 99 to perceive at least one of the sound image or the external sound.

(Configuration)

Figure 2:
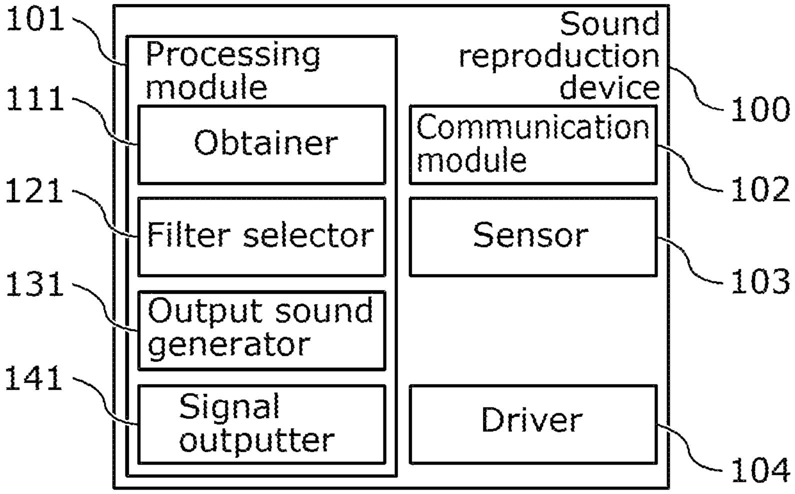
FIG. 2 is a block diagram illustrating the functional configuration of the sound reproduction device according the present embodiment.

Next, the configuration of sound reproduction device 100 according to the present embodiment is described with reference to FIG. 2. FIG. 2 is a block diagram illustrating the functional configuration of the sound reproduction device according the present embodiment.

As shown in FIG. 2, sound reproduction device 100 according to the present embodiment includes processing module 101, communication module 102, sensor 103, and driver 104.

Processing module 101 is a processing unit for performing various types of signal processing in sound reproduction device 100. For example, processing module 101 includes a processor and a memory, and fulfills various functions by causing the processor to execute a program stored in the memory.

Processing module 101 includes obtainer 111, filter selector 121, output sound generator 131, and signal outputter 141. The details of each functional unit of processing module 101 are described later together with the details of components other than processing module 101.

Communication module 102 is an interface unit for receiving sound information to be inputted to sound reproduction device 100. For example, communication module 102 includes an antenna and a signal converter, and receives sound information from the external device via a wireless communication. More specifically, communication module 102 receives, using an antenna, a wireless signal indicating sound information transformed into a format for the wireless communication. In this manner, sound reproduction device 100 obtains sound information from an external device via a wireless communication. The sound information obtained through communication module 102 is obtained by obtainer 111. In this manner, sound information is inputted to processing module 101. Note that the communication between sound reproduction device 100 and the external device may be performed via a wired communication.

For example, the sound information obtained by sound reproduction device 100 is encoded in a predetermined format such as MPEG-H 3D Audio (ISO/IEC 23008-3). As one example, the encoded sound information includes: information regarding a predetermined sound to be reproduced by sound reproduction device 100; and information regarding a localized position when the sound image of the sound is localized at a predetermined position in a three-dimensional sound field (i.e., a user perceives the sound as a sound coming from a predetermined direction), i.e., information regarding a predetermined direction. For example, the sound information includes information regarding multiple sounds including a first predetermined sound and a second predetermined sound, and when each of the sounds is reproduced, each sound image is localized for a user to perceive the sound as a sound coming from a different direction in the three-dimensional sound field.

This 3D sound can enhance the presence of a listening content or the like, for example, together with an image watched using 3D image reproduction device 200. Note that the sound information may include only the information regarding a predetermined sound. In this case, the information regarding a predetermined direction may be obtained separately. As described above, the sound information includes the first sound information related to the first predetermined sound and the second sound information related to the second predetermined sound. However, each sound image may be localized at a different position in the three-dimensional sound field by obtaining and simultaneously reproducing multiple types of sound information each including a different one of the first sound information and the second sound information. The type of input sound information is not particularly limited, and it is sufficient that sound reproduction device 100 is provided with obtainer 111 that supports various types of sound information.

Figure 3:
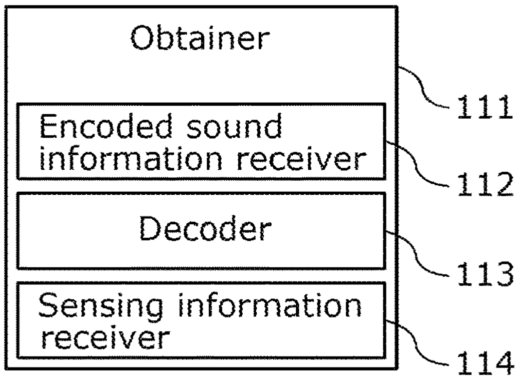
FIG. 3 is a block diagram illustrating the functional configuration of an obtainer according the present embodiment.

Here, one example of obtainer 111 is described with reference to FIG. 3. FIG. 3 is a block diagram illustrating the functional configuration of the obtainer according the present embodiment. As shown in FIG. 3, obtainer 111 according to the present embodiment includes, for example, encoded sound information receiver 112, decoder 113, and sensing information receiver 114.

Encoded sound information receiver 112 is a processing unit that receives encoded sound information obtained by obtainer 111. Encoded sound information receiver 112 provides the inputted sound information to decoder 113. Decoder 113 is a processing unit that generates the information regarding a predetermined sound included in the sound information and the information regarding a predetermined direction included in the sound information in a form used in the subsequent processes by decoding the sound information provided from encoded sound information receiver 112. Sensing information receiver 114 is described later together with the function of sensor 103.

Sensor 103 is a device for measuring a velocity of motion of the head of user 99. Sensor 103 is configured in combination of various sensors for use in motion detection such as a gyroscope sensor and an accelerometer. In the present embodiment, sensor 103 is included in sound reproduction device 100. However, for example, as with the case of sound reproduction device 100, sensor 103 may be included in the external device such as 3D image reproduction device 200 that operates in response to the motion of the head of user 99. In this case, sensor 103 need not be included in sound reproduction device 100. Alternatively, the motion of user 99 may be detected by using an external imaging device as sensor 103 to capture the motion of the head of user 99 and processing the captured image.

For example, sensor 103 is integrally attached to the housing of sound reproduction device 100, and measures a velocity of motion of the housing. Sound reproduction device 100 including the above housing moves integrally with the head of user 99 after being worn on user 99. Accordingly, this results in that sensor 103 can measure the velocity of motion of the head of user 99.

For example, as the amount of motion of the head of user 99, sensor 103 may measure the amount of rotation about at least one of three axes orthogonal to one another in the three-dimensional space, or the amount of displacement along at least one of the three axes. Alternatively, as the amount of motion of the head of user 99, sensor 103 may measure both the amount of rotation and the amount of displacement.

Sensing information receiver 114 obtains the velocity of motion of the head of user 99 from sensor 103. More specifically, sensing information receiver 114 obtains, as the velocity of motion, the amount of motion of the head of user 99 measured per unit time by sensor 103. In this manner, sensing information receiver 114 obtains at least one of a rotation rate or a displacement rate from sensor 103. The amount of motion of the head of user 99 obtained here is used to determine the coordinates and the orientation of user 99 in the three-dimensional sound field. In sound reproduction device 100, the relative position of the sound image is determined based on the determined coordinates and orientation of user 99, and the sound is reproduced. More specifically, the above function is implemented by filter selector 121 and output sound generator 131.

Filter selector 121 is a processing unit that determines from which direction in the three-dimensional sound field user 99 perceives a predetermined sound as a sound coming, based on the determined coordinates and orientation of user 99, and selects a 3D sound filter to be applied to the predetermined sound. The 3D sound filter is a function filter that causes user 99 to perceive an input predetermined sound as a sound coming from a predetermined direction based on a specific head-related transfer function, by convolving the predetermined sound with the specific head-related transfer function. In other words, a difference in sound pressure, a difference in time, a difference in phase, and the like are generated between the right sound signal and the left sound signal of a predetermined sound by inputting the predetermined sound (or information regarding the predetermined sound) into the 3D sound filter, and thus it is possible to output sound signals that achieves reproduction of the predetermined sound with the controlled incoming direction.

For example, 3D sound filter candidates for the selection are adjusted for each user 99 and prepared in advance. Each of the 3D sound filter candidates is calculated and prepared for a different incoming direction, and stored on a memory device (not shown) or the like for storing the 3D sound filters.

Figure 4:
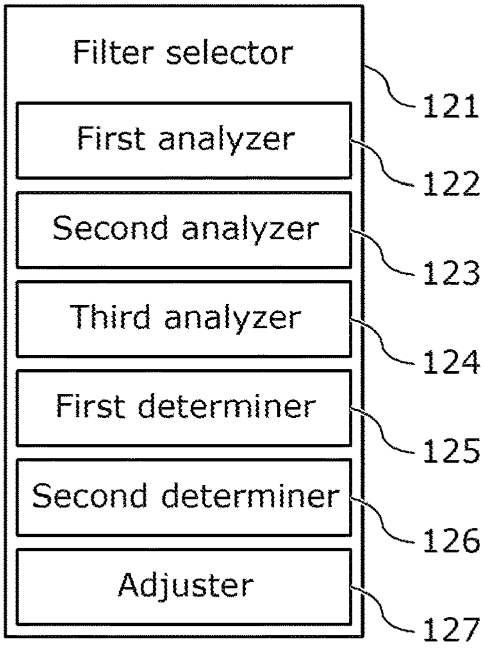
FIG. 4 is a block diagram illustrating the functional configuration of a filter selector according the present embodiment.

Here, one example of filter selector 121 is described with reference to FIG. 4. FIG. 4 is a block diagram illustrating the functional configuration of the filter selector according the present embodiment. As shown in FIG. 4, for example, filter selector 121 according to the present embodiment includes first analyzer 122, second analyzer 123, third analyzer 124, first determiner 125, second determiner 126, and adjuster 127.

First analyzer 122 is a processing unit that analyzes the type of a predetermined sound included in sound information. First analyzer 122 outputs, as the result of the analysis, information indicating which one of the types set in advance corresponds to the predetermined sound.

Note that, for example, the type of the predetermined sound may indicate whether to be a human voice or not, i.e., the predetermined sound may be of two types: a voice; and a non-voice. Alternatively, the type of the predetermined sound may be a type that requires no specific object, such as the first type, the second type, etc., into which a sound is classified from a sound source or the like according to the frequency characteristics. Moreover, the number of types is not particularly limited. The number of types may be determined by the types of an external sound inferred from the environment that uses sound reproduction device 100 and the types of the predetermined sound included in the sound information. The description regarding the type of the predetermined sound is also applied to the type of the external sound in the same manner.

Second analyzer 123 is a processing unit that analyzes the type of an external sound coming from the external environment of sound reproduction device 100 and audible to user 99. Second analyzer 123 outputs, as the result of the analysis, information indicating which one of the types set in advance corresponds to the external sound. The result of analysis of the type of the external sound by second analyzer 123 is used for a comparison with the type of the predetermined sound. Accordingly, as the external sound, a sound for which it is inferred that a user has difficulty listening to at least one of the predetermined sound or the external sound when the predetermined sound and the external sound overlap is used, and the other sounds may be eliminated. For example, the sound pressure of the predetermined sound is determined in advance based on the sound information and the sound volume set by user 99 in sound reproduction device 100. Accordingly, a threshold may be provided to determine whether the sound is used as the external sound based on whether the sound is within a sound pressure range in which sufficient interference with the predetermined sound reproduced may occur.

Figure 7:
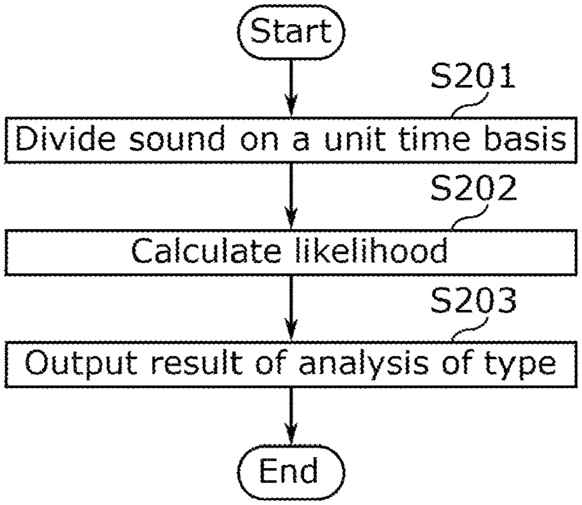
FIG. 7 is a flowchart illustrating an operation of the first analyzer and the second analyzer according to the embodiment.

The explanation of analyzing the type of the predetermined sound using first analyzer 122 and the explanation of analyzing the type of the external sound using second analyzer 123 are further described later with reference to FIG. 7.

Third analyzer 124 is a processing unit that analyzes the incoming direction of the external sound. Third analyzer 124 obtains external sounds picked up by each of two or more sound pick-up devices, as external sound information of each sound pick-up device, identifies one external sound such that the external sound in the external sound information is the same among the two or more sound pick-up devices, and analyzes the incoming direction of the identified external sound through calculation using a difference in sound arrival time, a difference in sound pressure, a difference in phase, etc. Third analyzer 124 outputs, as the result of the analysis, information indicating which direction the external sound comes from relative to user 99.

First determiner 125 is a processing unit that determines whether the type of the predetermined sound and the type of the external sound match. For this purpose, first determiner 125 obtains the result of the analysis by first analyzer 122 and the result of the analysis by second analyzer 123. Based on the results of the analyses, first determiner 125 determines whether the incoming direction of the predetermined sound and the incoming direction of the external sound match. First determiner 125 outputs, as the result of the determination, information indicating whether the type of the predetermined sound and the type of the external sound match. Note that, when multiple predetermined sounds and multiple external sounds exist, first determiner 125 may make the determination in all combinations of the predetermined sounds and the external sounds, or may make the determination in all combinations of the predetermined sounds and the external sounds limited to within a predetermined range viewed from user 99.

Second determiner 126 is a processing unit that determines whether the incoming direction of a predetermined sound and the incoming direction of an external sound obtained as the result of the analysis by third analyzer 124 overlap. Second determiner 126 calculates the incoming direction of the predetermined sound based on the predetermined direction included in the sound information and the coordinates and orientation of user 99, and compares the calculated incoming direction of the predetermined sound with the incoming direction of the external sound to determine whether they overlap. In the determination by second determiner 126, the incoming direction of the predetermined sound and the incoming direction of the external sound need not match completely. For example, when the incoming direction of the predetermined sound and the incoming direction of the external sound are within a certain angle range and the mutual interference between the predetermined sound and the external sound clearly causes user 99 to have difficulty distinguishing the sounds, a threshold regarding such an angle range may be provided. The threshold depends on the sound pressure of the predetermined sound, the sound pressure of the external sound, the minimum distinguishable angle of user 99, etc., and thus the threshold may be provided for each user 99. Alternatively, the threshold may be set as a fixed value, such as 5 degrees, 10 degrees, 15 degrees, or 20 degrees, which is determined as an average value for users 99.

Adjuster 127 is a processing unit that makes an adjustment based on the result of the determination by first determiner 125 and the result of the determination by second determiner 126 to improve the distinguishability of at least one of the predetermined sound or the external sound, and selects a 3D sound filter. User 99 may set in advance a value indicating whether adjuster 127 improves the distinguishability of the predetermined sound or the distinguishability of the external sound. Adjuster 127 reads in the set value, and makes the adjustment according to the set value to improve at least one of the distinguishability of the predetermined sound or the distinguishability of the external sound. The adjustment by adjuster 127 is described later together with the operation of sound reproduction device 100.

The sound adjustment by adjuster 127 is performed by changing a 3D sound filter from an original 3D sound filter based on the predetermined direction in the sound information to another 3D sound filter for the incoming direction of a sound to implement the adjustment. In other words, the sound adjustment by adjuster 127 can be regarded as determining another 3D sound filter to which the 3D sound filter is changed. As the result, filter selector 121 selects and outputs the changed 3D sound filter to which the 3D sound filter is changed from a default 3D sound filter. Here, the incoming direction of the sound of the output sound signal is different from the predetermined direction in the sound information.

Note that, instead of setting the default 3D sound filter as described above, the 3D sound filter may be directly determined. In other words, the wording "changing a 3D sound filter" is an expression used for descriptive purposes, and the present disclosure includes directly selecting and outputting the 3D sound filter without using the default 3D sound filter.

Output sound generator 131 is a processing unit that generates an output sound signal using the 3D sound filter selected in filter selector 121 by inputting information regarding the predetermined sound included in the sound information to the selected 3D sound filter.

Figure 5:
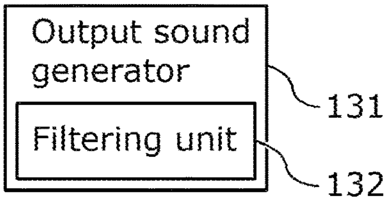
FIG. 5 is a block diagram illustrating the functional configuration of an output sound generator according the present embodiment.

Here, one example of output sound generator 131 is described with reference to FIG. 5. FIG. 5 is a block diagram illustrating the functional configuration of the output sound generator according the present embodiment. As shown in FIG. 5, output sound generator 131 according to the present embodiment includes, for example, filtering unit 132. Filtering unit 132 reads in the filters continuously selected by filter selector 121 in turn, and inputs the corresponding information regarding the predetermined sound in the time domain, thereby continuously outputting a sound signal for which the incoming direction of the predetermined sound is controlled in the three-dimensional sound field. In this manner, the sound information divided on a process unit time basis in the time domain is outputted as a serial sound signal (an output sound signal) in the time domain.

Signal outputter 141 is a functional unit that outputs the generated output sound signal to driver 104. Signal outputter 141 generates a waveform signal by converting from a digital signal to an analog signal based on the output sound signal or the like, causes driver 104 to generate a sound wave based on the waveform signal, and presents a sound to user 99. For example, driver 104 includes, for example, a diaphragm and a drive assembly such as a magnet and a voice coil. Driver 104 actuates the drive assembly according to the waveform signal, and the diaphragm is vibrated by the drive assembly. In this manner, driver 104 generates a sound wave by vibrating the diaphragm according to the output sound signal. The sound wave propagates through the air and reaches the ears of user 99, and user 99 perceives the sound.

(Operation)

Figure 6:
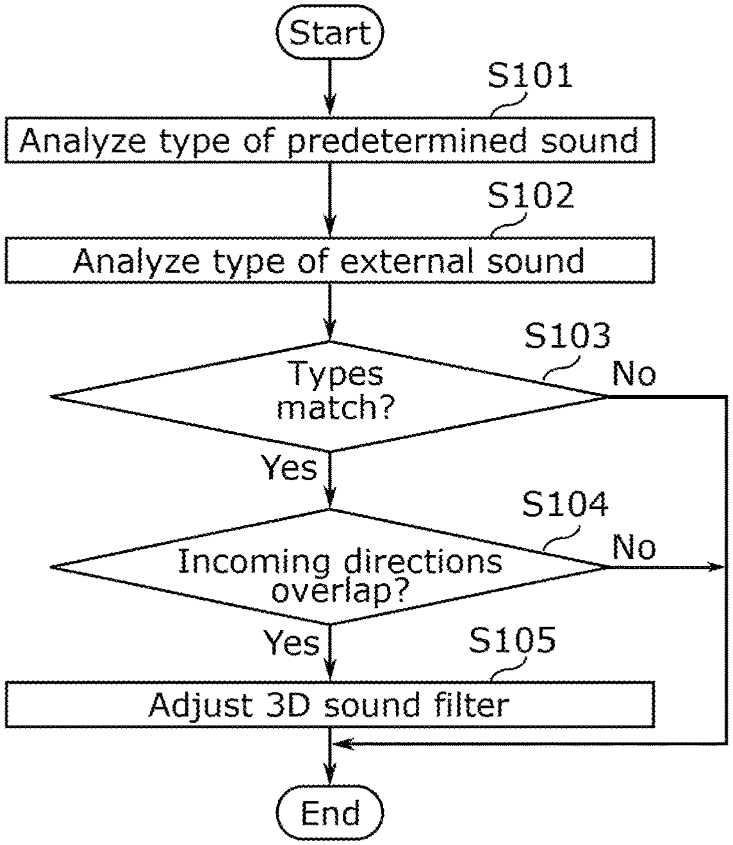
FIG. 6 is a flowchart illustrating an operation of the sound reproduction device according to the embodiment.

Next, the operation of above-mentioned sound reproduction device 100 is described with reference to FIG. 6 and FIG. 7. FIG. 6 is a flowchart illustrating an operation of the sound reproduction device according to the embodiment. FIG. 7 is a flowchart illustrating an operation of the first analyzer and the second analyzer according to the embodiment. First, after the operation of sound reproduction device 100 starts, obtainer 111 obtains sound information through communication module 102. The sound information is decoded into information regarding a predetermined sound and information regarding a predetermined direction by decoder 113, and selection of a filter starts.

In filter selector 121, as a default filter, a 3D sound filter that causes the predetermined sound to be reproduced to have the incoming direction preset in the content is read out from a storage device or the like.

Every time another 3D sound filter is selected such that the predetermined sound comes from the incoming direction, sound reproduction device 100 applies the selected 3D sound filter to perform sound reproduction. In parallel to the sound reproduction, first analyzer 122 analyzes the type of the predetermined sound being reproduced (S101), and continuously outputs the result of the analysis. The analysis of the type of the predetermined sound by first analyzer 122 is performed as shown in FIG. 7. First, first analyzer 122 divides the predetermined sound on a predetermined process unit time basis to generate divided data (S201). Next, first analyzer 122 inputs the divided data to a machine learning model such as a neural network or the like established for clustering into classes corresponding to the types, and causes the machine learning model to calculate a likelihood for each of the classes (S202). As the result, first analyzer 122 determines the inputted divided data as being of the type corresponding to the class having the highest likelihood, and outputs the result of the analysis indicating that the inputted divided data corresponds to the type having the highest likelihood (S203).

Back to FIG. 6, the sound pick-up device for picking up an external sound starts to pick up the external sound simultaneously with the start of the operation of sound reproduction device 100, and sequentially outputs the external sound information to second analyzer 123. In the same manner as first analyzer 122, second analyzer 123 analyzes the type of the external sound of the obtained external sound information (S102), and continuously output the result of the analysis.

Third analyzer 124 analyzes the incoming direction of the external sound of the obtained external sound information, and continuously outputs the result of the analysis. The analyses by first analyzer 122, second analyzer 123, and third analyzer 124 are performed in parallel, and thus the order of steps S101 and S102 of FIG. 6 may be reversed.

Next, first determiner 125 determines whether the type of the predetermined sound and the type of the external sound match (S103). When the type of the predetermined sound and the type of the external sound match (Yes in S103), second determiner 126 further determines whether the incoming direction of the predetermined sound and the incoming direction of the external sound overlap (S104). When the incoming direction of the predetermined sound and the incoming direction of the external sound overlap (Yes in S104), adjuster 127 adjusts the 3D sound filter to improve the distinguishability of the sound (S105). For example, adjuster 127 determines another 3D sound filter to change the 3D sound filter from a default 3D sound filter in which the predetermined direction and the incoming direction match to another 3D sound filter in which the predetermined direction and the incoming direction are different. In contrast, when the type of the predetermined sound and the type of the external sound do not match (No in S103) and when the incoming direction of the predetermined sound and the incoming direction of the external sound do not overlap (No in S104), filter selector 121 terminates the processing, and outputs the default 3D sound filter as the selected 3D sound filter.

Figure 8:
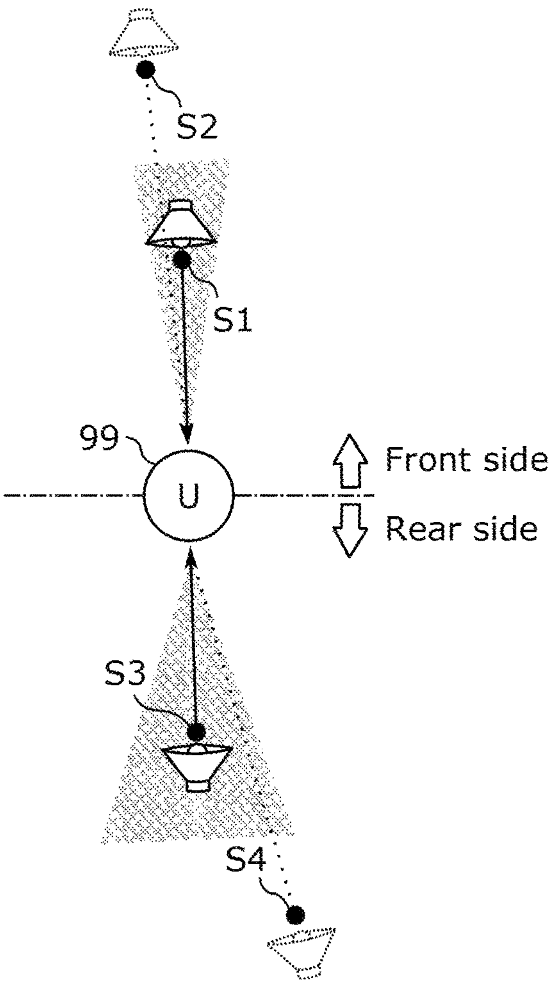
FIG. 8 is the first diagram illustrating the incoming direction of a predetermined sound through the selected 3D sound filter according to the present embodiment.
Figure 9:
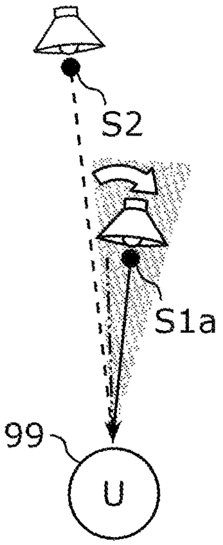
FIG. 9 is the second diagram illustrating the incoming direction of the predetermined sound through the selected 3D sound filter according to the present embodiment.
Figure 10:
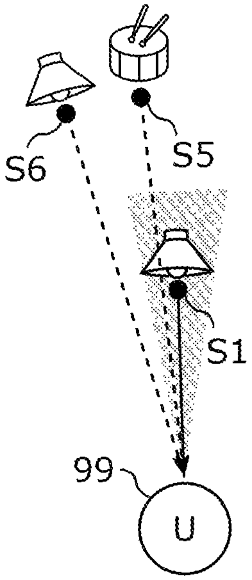
FIG. 10 is the third diagram illustrating the incoming direction of the predetermined sound through the selected 3D sound filter according to the present embodiment.

The following describes the determination of the 3D sound filter (i.e., the change in the 3D sound filter) by adjuster 127 with respect to FIG. 8 through FIG. 10. FIG. 8 is the first diagram illustrating the incoming direction of the predetermined sound through the selected 3D sound filter according to the present embodiment. FIG. 9 is the second diagram illustrating the incoming direction of the predetermined sound through the selected 3D sound filter according to the present embodiment. FIG. 10 is the third diagram illustrating the incoming direction of the predetermined sound through the selected 3D sound filter according to the present embodiment. In FIG. 8 through FIG. 10, user 99 who faces the upper direction of the paper is schematically shown by the circle marked with "U", and user 99 stands upright in the direction perpendicular to the paper.

Furthermore, in FIG. 8 through FIG. 10, the localized position of the predetermined sound is shown as the black circle together with the virtual-sound-source icon that varies depending on the sound type.

As shown in FIG. 8, the localized position of the first predetermined sound at a point in time is located at first position S1. At the same point in time, the first external sound comes from second position S2. The first predetermined sound and the first external sound are marked with the same speaker icon, and thus they are the same type of sound. Accordingly, the result of the determination by first determiner 125 indicates that the types match. Moreover, the range marked by dotted hatching in FIG. 8 (the front side in FIG. 8) is a range that centrally covers the incoming direction of the first predetermined sound and can be regarded as being an incoming direction overlapping with the incoming direction of the first predetermined sound. The incoming direction of the first external sound is within this range, and thus the first predetermined sound and the first external sound overlap.

Accordingly, the result of the determination by second determiner 126 indicates that the incoming directions overlap. As the results, in the example of FIG. 8, the 3D sound filter is changed to decrease the sound pressure of the first external sound to improve the distinguishability of the first predetermined sound. For this purpose, adjuster 127 changes the 3D sound filter such that a signal having a phase opposite to that of the first external sound is generated from the external sound information of the first external sound and the generated signal is superposed. In this manner, in the output sound signal obtained by inputting information regarding the predetermined sound to the 3D sound filter, a signal having a phase opposite to that of the first external sound is added. Accordingly, the coming first external sound is cancelled out, thereby reducing the sound pressure of the first external sound.

Moreover, in FIG. 8, the dash-dot-dash line extending from left to right through user 99 shows a virtual boundary surface to separate the head of user 99 into the front and rear portions. The boundary surface may be a surface defined along the ear canal of user 99, a surface passing through the backmost points of the pinnae of user 99, or simply a surface passing through the center of gravity of the head of user 99. It is known that there is a difference in the audibility of sound between in front of and behind such a boundary surface, i.e., between in front of and behind user 99. Accordingly, it is effective to differentiate the change characteristics of the 3D sound filter between the front side and the rear side separated by the boundary surface.

In FIG. 8, the localized position of the second predetermined sound at the same point in time is located at third position S3. At the same point in time, the second external sound comes from forth position S4. The second predetermined sound and the second external sound are marked with the same speaker icon, and thus they are the same type of sound. Accordingly, the result of the determination by first determiner 125 indicates that the types match. Moreover, the range marked by dotted hatching in FIG. 8 (the rear side in FIG. 8) is a range that centrally covers the incoming direction of the second predetermined sound and can be regarded as being an incoming direction overlapping with the incoming direction of the second predetermined sound. The incoming direction of the second external sound is within this range, and thus the second predetermined sound and the second external sound overlap. Accordingly, the result of the determination by second determiner 126 indicates that the incoming directions overlap. As the results, in the example of FIG. 8, the 3D sound filter is changed to decrease the sound pressure of the second external sound to improve the distinguishability of the second predetermined sound.

It is assumed that the first predetermined sound and the second predetermined sound are the same other than their incoming directions, and the first external sound and the second external sound are the same other than their incoming directions. However, the range in the rear side in which the incoming direction of the second predetermined sound and the incoming direction of the second external sound can be regarded as overlapping is set to be larger than the range in the front side in which the incoming direction of the first predetermined sound and the incoming direction of the first external sound can be regarded as overlapping. In this manner, in comparison with the front side, the configuration that supports a wider minimum distinguishable angle for the incoming direction of a sound coming from the rear side (i.e., from behind user 99) may be provided.

Moreover, as another example of the adjustment by adjuster 127, as shown in FIG. 9, the 3D sound filter may be changed such that the incoming direction of the first predetermined sound is turned to shift the localized position of the first predetermined sound to fifth position S1*a*. Here, the incoming direction of the first predetermined sound is turned in a direction away from the incoming direction of the first external sound until the range marked by dotted hatching does not overlap with the incoming direction of the external sound. In this example, both the distinguishability of the first predetermined sound and the distinguishability of the first external sound are improved, and thus user 99 can listen to the both sounds. Alternatively, adjuster 127 may also allow user 99 to listen to the sound by simply decreasing the sound pressure of the first predetermined sound to improve the distinguishability of the first external sound.

Moreover, in the case as shown in FIG. 10, adjuster 127 need not particularly change the 3D sound filter. As shown in FIG. 10, with respect to the first predetermined sound, the third external sound comes from sixth position S5, and the fourth external sound comes from seventh position S6. As shown in FIG. 10, the first predetermined sound and the third external sound are of different types each marked by a different icon, and thus it is possible to distinguish and listen to the sounds even when their incoming directions overlap. The first predetermined sound and the fourth external sound are of the same type marked by the same speaker icon, but their incoming directions are sufficiently different. Accordingly, it is possible to distinguish and listen to the sounds. As described above, when the result of the determination by first determiner 125 indicates that the types are different, and when the result of the determination by second determiner 126 indicates that the incoming directions do not overlap, adjuster 127 need not change the 3D sound filter.

Note that in the case where the incoming directions match completely even when the sound types are different, in the case where the sounds have influence on each other due to their sound pressures even when their incoming directions do not overlap, or the like, the 3D sound filter may be changed.

In this manner, in the present embodiment, when it is difficult to distinguish between the predetermined sound and the external sound due to the sameness of the types of the predetermined sound and the external sound, the overlap of incoming directions of the predetermined sound and the external sound, or the like, at least one of the distinguishability of the predetermined sound or the distinguishability of the external sound is improved by performing as least one of the following: (a) adjustment of at least one of the sound pressure of the predetermined sound or the sound pressure of external sound; or (b) adjustment of the incoming direction of the predetermined sound. Accordingly, the audibility of at least one of the predetermined sound or the external sound whose distinguishability is improved can be increased, and thus it is possible to cause user 99 to perceive the 3D sounds more appropriately.

OTHER EMBODIMENTS

Although a preferred embodiment has been described above, the present invention is not limited to the foregoing embodiment.

For example, in the foregoing embodiment, an example in which a sound does not follow the motion of the head of a user has been described, but the present disclosure is also effective in the case where a sound follows the motion of the head of a user. In other words, in the operation which causes a user to perceive a predetermined sound as a sound coming from the first position that relatively moves along with the motion of the head of a user, when the type of the predetermined sound and the type of an external sound match and their incoming directions overlap, the 3D sound filter may be changed to improve the distinguishability of at least one of them.

Moreover, for example, the sound reproduction device described in the foregoing embodiment may be implemented as a single device including all the components, or by assigning each function to a different device and cooperating with each other. In the latter case, an information processing device such as a smart phone, a tablet terminal, or a PC may be used as a device corresponding to a processing module.

As a configuration different from that in the description of the foregoing embodiment, for example, it is also possible to correct the original sound information in the decoder and thereby select the changed 3D sound filter. More specifically, the decoder according to the present example is a processing unit that corrects the original sound information as well as generates information regarding the predetermined direction included in the sound information. After performing the same operations as the first analyzer, the second analyzer, the third analyzer, the first determiner, and the second determiner, the decoder corrects the information regarding the predetermined direction to turn the incoming direction of the predetermined sound in a direction away from the incoming direction of the external sound by an angle set in advance, as needed. In this manner, the changed 3D sound filter according to the foregoing embodiment is applied only by selecting a 3D sound filter for defining the incoming direction of the predetermined sound based on the corrected information regarding the predetermined direction outputted from the decoder.

As described above, the information processing method or the like according to the present disclosure may be implemented by correcting the information regarding the predetermined direction in the original sound information. For example, a sound reproduction device that produces the same effects as the present disclosure can be implemented simply by replacing the decoder of the conventional 3D sound reproduction device with the decoder as described above.

Moreover, the sound reproduction device according to the present disclosure can be implemented as a sound reproduction device that is connected to a reproduction device including only a driver and only outputs an output sound signal to the reproduction device using the 3D sound filter selected based on the obtained sound information. In this case, the sound reproduction device may be implemented as a hardware provided with a dedicated circuit, or as a software for causing a general-purpose processor to execute a specific process.

Moreover, in the foregoing embodiment, the process performed by a specific processing unit may be performed by another processing unit. Moreover, the order of the processes may be changed, or the processes may be performed in parallel.

Moreover, in the foregoing embodiment, each structural component may be realized by executing a software program suitable for each structural component. Each structural component may be realized by reading out and executing a software program recorded on a recording medium, such as a hard disk or a semiconductor memory, by a program executer, such as a CPU or a processor.

Furthermore, each structural component may be realized by hardware. For example, each structural component may be a circuit (or an integrated circuit). The circuits may constitute a single circuit as a whole, or may be individual circuits. Furthermore, each of the circuits may be a general-purpose circuit or a dedicated circuit.

Furthermore, an overall or specific aspect of the present disclosure may be implemented using a system, a device, a method, an integrated circuit, a computer program, or a computer-readable recording medium such as a CD-ROM. Furthermore, the overall or specific aspect of the present disclosure may also be implemented using any combination of systems, devices, methods, integrated circuits, computer programs, or recording media.

For example, the present disclosure may be implemented as a sound signal reproduction method executed by a computer, or may be implemented as a program for causing a computer to execute the sound signal reproduction method. The present disclosure may be implemented as a computer-readable non-transitory recording medium that stores such a program.

The present disclosure includes, for example, embodiments that can be obtained by various modifications to the respective embodiments and variations that may be conceived by those skilled in the art, and embodiments obtained by combining structural components and functions in the respective embodiments in any manner without departing from the essence of the present disclosure.

INDUSTRIAL APPLICABILITY

The present disclosure is useful in reproducing a sound, such as causing a user to perceive a 3D sound.

The invention claimed is:

1. An information processing method of generating an output sound signal from sound information including information regarding a predetermined sound and information regarding a predetermined direction, the output sound signal being a signal for causing a user to three-dimensionally perceive the predetermined sound through a three-dimensional (3D) sound filter, the information processing method comprising:

selecting a first 3D sound filter based on the predetermined direction;

obtaining an external sound and analyzing an incoming direction of the external sound;

judging whether the predetermined direction and the incoming direction of the external sound overlap; and generating the output sound signal to cause an incoming direction of the predetermined sound to be different from the predetermined direction by determining a second 3D sound filter different from the first 3D sound filter based on a result of the judging.

2. The information processing method according to claim 1, wherein the selecting includes:

obtaining at least one of a rotation rate or a displacement rate of a head of the user;

determining coordinates and an orientation of the user in a three-dimensional sound field based on the at least one of the rotation rate or the displacement rate of the head of the user; and selecting the first 3D sound filter based on the coordinates and the orientation of the user.

3. The information processing method according to claim 1, wherein the generating includes:

when the result of the judging indicates that the predetermined direction and the incoming direction of the external sound overlap, adjusting the 3D sound filter to improve a distinguishability of the predetermined sound by changing the 3D sound filter from the first 3D sound filter selected in which the incoming direction of the predetermined sound matches the predetermined direction to the second 3D sound filter in which the incoming direction of the predetermined sound is different from the predetermined direction.

4. The information processing method according to claim 1, wherein whether the predetermined direction and the incoming direction of the external sound overlap is judged based on whether a difference in angle between the predetermined direction and the incoming direction of the external sound is less than a threshold.

5. The information processing method according to claim 4, wherein a first threshold is greater than a second threshold, the first threshold being the threshold on a behind side relative to a virtual boundary surface separating a head of the user into a front portion and a rear portion, the second threshold being the threshold on a front side relative to the virtual boundary surface.

6. The information processing method according to claim 1, wherein the information regarding the predetermined direction is corrected to turn the incoming direction of the predetermined sound in a direction away from the incoming direction of the external sound by an angle set in advance.

7. A sound reproduction device that generates and reproduces an output sound signal based on sound information including information regarding a predetermined sound and information regarding a predetermined direction, the sound reproduction device comprising:

a filter selector that selects a first 3D sound filter based on the predetermined direction, the first 3D sound filter being a filter for causing a user to three-dimensionally perceive the predetermined sound;

a third analyzer that analyzes an incoming direction of an external sound;

a second judger that judges whether the predetermined direction and the incoming direction of the external sound overlap; and an output sound generator that generates the output sound signal to cause an incoming direction of the predetermined sound to be different from the predetermined direction by determining a second 3D sound filter different from the first 3D sound filter based on a judgement result.

8. The sound reproduction device according to claim 7, wherein the filter selector:

obtains at least one of a rotation rate or a displacement rate of a head of the user;

determines coordinates and an orientation of the user in a three-dimensional sound field based on the at least one of the rotation rate or the displacement rate of the head of the user; and selects the first 3D sound filter based on the coordinates and the orientation of the user.

9. The sound reproduction device according to claim 7, wherein the output sound generator:

when the judgement result indicates that the predetermined direction and the incoming direction of the external sound overlap, adjusts the 3D sound filter to improve a distinguishability of the predetermined sound by changing the 3D sound filter from the first 3D sound filter selected in which the incoming direction of the predetermined sound matches the predetermined direction to the second 3D sound filter in which the incoming direction of the predetermined sound is different from the predetermined direction.

10. The sound reproduction device according to claim 7, wherein the second judger judges whether the predetermined direction and the incoming direction of the external sound overlap, based on whether a difference in angle between the predetermined direction and the incoming direction of the external sound is less than a threshold.

11. The sound reproduction device according to claim 10, wherein a first threshold is greater than a second threshold, the first threshold being the threshold on a behind side relative to a virtual boundary surface separating a head of the user into a front portion and a rear portion, the second threshold being the threshold on a front side relative to the virtual boundary surface.

12. A non-transitory computer-readable recording medium for use in a computer, the recording medium having a program recorded thereon for causing the computer to execute the information processing method according to claim 1.

* * * * *